(12) United States Patent
Old

(10) Patent No.: US 8,667,044 B1
(45) Date of Patent: Mar. 4, 2014

(54) ITERATIVE STAGE AS DIVIDEND OPERAND PRESCALER FOR FIXED-RADIX DIVISION

(75) Inventor: Gordon I. Old, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 1173 days.

(21) Appl. No.: 12/353,231

(22) Filed: Jan. 13, 2009

(51) Int. Cl.
*G06F 7/52* (2006.01)

(52) U.S. Cl.
USPC ........................................................ 708/654

(58) Field of Classification Search
None
See application file for complete search history.

(56) References Cited

PUBLICATIONS

Atkins, D.E.; , "Higher-Radix Division Using Estimates of the Divisor and Partial Remainders," Computers, IEEE Transactions on , vol. C-17, No. 10, pp. 925-934, Oct. 1968 doi: 10.1109/TC.1968. 226439.*
Hung, P.; Fahmy, H.; Mencer, O.; Flynn, M.J.; , "Fast division algorithm with a small lookup table," Signals, Systems, and Computers, 1999. Conference Record of the Thirty-Third Asilomar Conference on , vol. 2, no., pp. 1465-1468 vol. 2, Oct. 24-27, 1999 doi: 10.1109/ACSSC.1999.831992.*
Lang, Thomas and Montuschi, Paolo, "Very-High Radix Combined Division and Square Root with Prescaling and Selection by Rounding", Proceeding of the 12$^{th}$ Symposium on computer Arithmetic, IEEE Computer Society Press, Jul. 19-21, 1995, pp. 124-131.

* cited by examiner

*Primary Examiner* — Idriss N Alrobaye
*Assistant Examiner* — Dayton Lewis-Taylor
(74) *Attorney, Agent, or Firm* — W. Eric Webostad; Gerald Chan

(57) ABSTRACT

Radix-based division is described. A dividend operand and a divisor operand are obtained. An estimate that is a reciprocal of the divisor operand is obtained. For a prescaling mode, a prescaling iteration is performed which includes: multiplying the divisor operand with the estimate to provide a prescaled divisor; apportioning the dividend operand into portions from most significant to least significant; providing the estimate to iteration blocks ordered from highest to lowest; providing the most significant to the least significant of the portions of the dividend operand respectively to the highest to the lowest of the iteration blocks; respectively multiplying the portions of the dividend operand with the estimate to provide first partial products; and parsing most significant residue portions and least significant residue portions as associated with order of the iteration blocks from the first partial products.

18 Claims, 5 Drawing Sheets

US 8,667,044 B1

ITERATIVE STAGE AS DIVIDEND OPERAND PRESCALER FOR FIXED-RADIX DIVISION

FIELD OF THE INVENTION

The invention relates to integrated circuit devices (ICs). More particularly, the invention relates to an iterative stage as a dividend operand prescaler for division for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Heretofore, prescaling of dividend and divisor operands for division, particularly "high" fixed-radix division, was done by having one multiplier for prescaling the dividend and another multiplier for prescaling the divisor. By "high" fixed-radix division, it is generally meant radix integer values above radix 4. Radix-based division is linear in that each iteration improves the quotient estimate by a fixed proportion, i.e. a constant number of bits, and hence is referred to herein as fixed-radix division. The phrase "high fixed-radix" is used herein to describe the number of bits resolved in each iteration as being for radices greater than 4. Both of such multipliers received an estimate, which was over the reciprocal of the divisor, for such respective prescalings. The output of each of such dividend and divisor prescalings generally was in a non-redundant format, such as a two's complement format.

Multiplication of larger operands involves a larger multiplier circuit, hence greater delays. For dividend prescaling, the entire dividend was multiplied by the estimate using such multiplier, and as the dividend may be a significantly large number, meaning a significant delay. If a carry chain was used for such multiplication, such carry chain may be relatively long. This meant that the delay due to carry chain propagation was relatively long. While carry chains are typically used, carry chains are not necessarily used.

SUMMARY OF THE INVENTION

One or more aspects generally relate to an iterative stage as a dividend operand prescaler for division.

An aspect relates generally to a method of fixed-radix division. An estimate that is a reciprocal of a divisor operand is obtained. For a prescaling mode, a prescaling iteration is performed which includes: multiplying the divisor operand with the estimate to provide a prescaled divisor; apportioning a dividend operand into portions from most significant to least significant; providing the estimate to iteration blocks ordered from highest to lowest; providing the most significant to the least significant of the portions of the dividend operand respectively to the highest to the lowest of the iteration blocks; respectively multiplying the portions of the dividend operand with the estimate to provide first partial products; and parsing most significant residue portions and least significant residue portions as associated with order of the iteration blocks from the first partial products.

Another aspect relates generally to an iteration engine for fixed-radix division. A dividend input port is coupled for input to a dividend bus. A divisor input port is coupled for input to a look-up table and a multiplier. An estimate bus and the multiplier are coupled to receive output from the look-up table. A divisor bus is coupled to receive output from the multiplier. The dividend bus is configured to apportion a dividend operand among iteration blocks. A multiplexer stage is coupled to the divisor bus, the dividend bus, and the estimate bus on a data input side of the multiplexer stage. A data output side of the multiplexer stage coupled to the iteration blocks. The multiplexer stage is further coupled to the feedback bus on the data input side of the multiplexer stage. The multiplexer stage has a select port for putting the iteration engine into either a prescaling mode or a calculation mode. The iteration blocks are arranged in order from highest to lowest. Each of the iteration blocks is configured to provide a most significant residue portion and a least significant residue portion respectively associated therewith. A highest order of the iteration blocks is coupled to a feedback bus and a quotient output port for providing the most significant residue portion of the highest order of the iteration blocks respectively thereto. Each of the iteration blocks other than highest order is coupled to provide the most significant residue portion thereof to the multiplexer stage for input to an iteration block immediately higher in the order. Each of the iteration blocks is coupled to provide the least significant residue portion thereof to the multiplexer stage for feedback input thereto.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
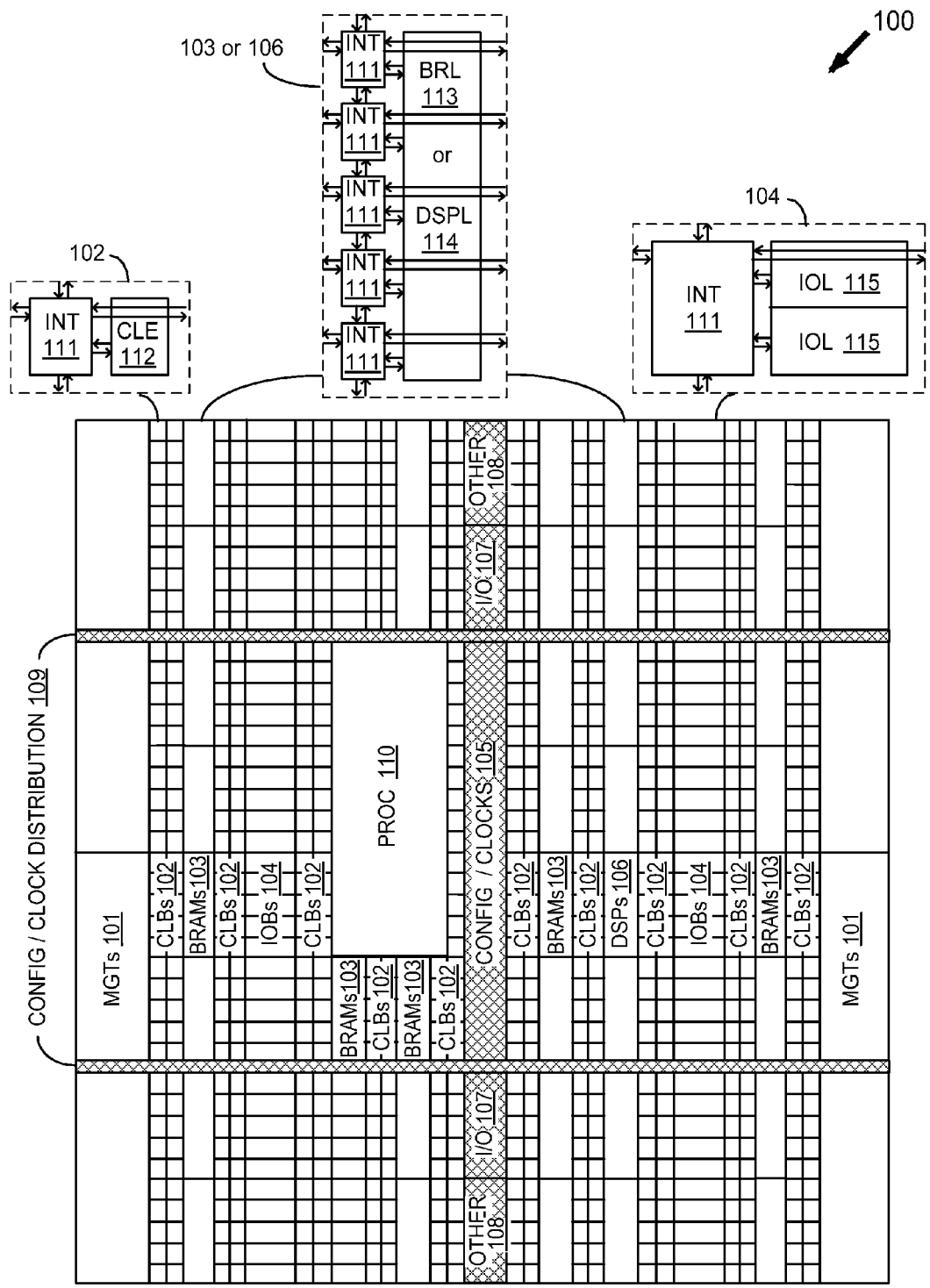
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
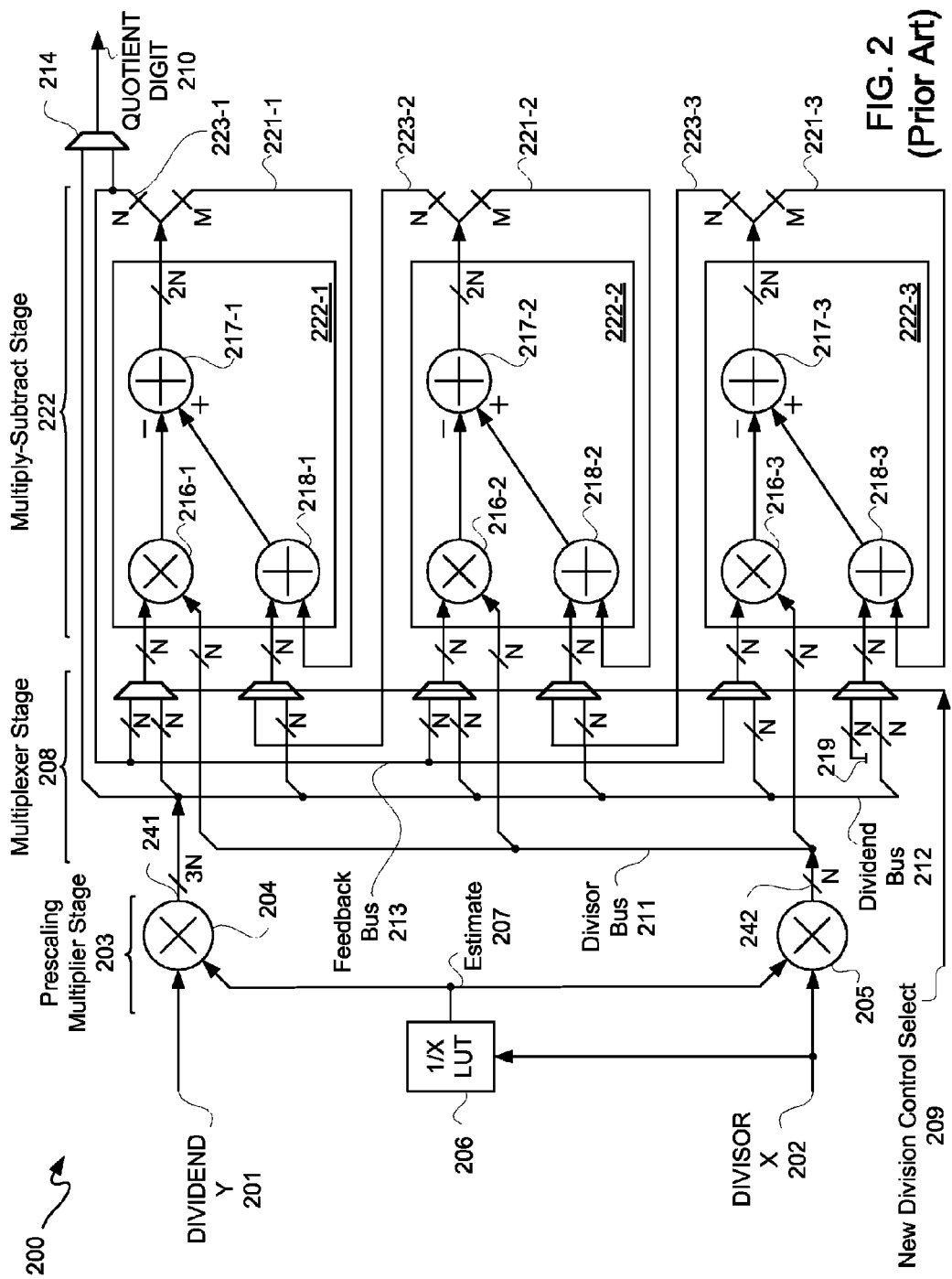
FIG. 2 is a circuit diagram of an iteration engine of the prior art for fixed-radix division.

In order to more clearly appreciate differences between an iteration engine of the past and the novel iteration engine described, a more detailed description of a prior iteration engine is provided with reference to FIG. 2. FIG. 2 is a circuit diagram depicting an iteration engine 200 of the prior art. Iteration engine 200 is for high fixed-radix division. In FIG. 2. three iterative portions are illustratively shown, though the number of iteration portions or sections may vary, namely be greater for larger operands and smaller for higher radices. Many buses are indicated as being N bits wide for purposes of clarity by way of example and not limitation. However, it should be understood that each bus varies in line with the $\log_2$ of the radix (e.g. radix 65536 implies N=16). However, it should be understood that there may be variations from N in bus width, where such variations plus or minus 2 bits to accommodate overlaps, namely where each iteration result overlaps a previous iteration result so as to allow correction of the least significant ("LS") digits of the previous iterative estimate. Such deviations from N are more apparent at the output of iterations sections. For example, the most significant ("MS") residues at the outputs of iteration sections 222-1 through 222-3, namely outputs associated with buses 223-1 through 223-3, are N bits wide. However, the LS residues at the outputs of iteration sections 222-1 through 222-3, namely outputs associated with buses 221-1 through 221-3, are M bits wide, where M is equal to N+k where k is the size of the overlap. The overlap is at least 2 bits to allow for positive or negative errors, but may be larger than two bits.

A dividend Y 201 is provided as an input to multiplier 204, and a divisor X 202 is provided as an input to a multiplier 205 and to a look-up table ("LUT") 206. Responsive to divisor X 202 provided to LUT 206, a reciprocal of divisor X 202 is output from LUT 206. This reciprocal of divisor X 202 is indicated as estimate 207.

Estimate 207 is provided as an input to multiplier 204 and as an input to multiplier 205. Thus, dividend Y 201 is multiplied by a reciprocal of divisor X 202 by multiplier 204, and divisor X 202 is multiplied by a reciprocal thereof by multiplier 205. These multiplications are known as prescaling, and hence multipliers 204 and 205 are generally indicated as a prescaling multiplier stage 203.

Thus, for high fixed-radix division, prescaling of both operands, namely dividend Y 201 and divisor X 202, is performed, where such operands are prescaled by an estimate 207 which is the reciprocal of divisor X 202. Prescaling of dividend Y 201 and divisor X 202 by prescaling multiplier stage 203 provides respective two's complement formatted outputs, namely prescaled dividend 241 and prescaled divisor 242 respectively output from multipliers 204 and 205. Thus, fixed-radix division in the embodiment of FIG. 2 is initiated with a prescaled dividend and a prescaled divisor each of which are in a two's complement format. Such prescaling is described in additional detail in article entitled "Very-High Radix Combined Division Square Root with Prescaling and Selection by Rounding" by Tomás Lang and Paolo Montuschi, in the Proceedings of the Twelfth Symposium on Computer Arithmetic, published in 1995 by the IEEE Computer Society Press, at pages 124-131.

After prescaling by prescaling multiplier stage 203, an iterative calculation is commenced with two's complement inputs, namely prescaled dividend 241 and prescaled divisor 242, selectively provided to a multiply-subtract stage 222 via multiplexer stage 208. Prescaled dividend 241 is provided to dividend bus 212 of multiplexer stage 208, and prescaled divisor 242 is provided to divisor bus 211 of multiplexer stage 208.

Multiplexers of multiplexer stage 208 select between a new data input from prescaling multiplier stage 203 for initiation of a new fixed-radix division and feedback from output of multiply-subtract stage 222 for a subsequent iteration in an ongoing fixed-radix division. In other words, once prescaling is performed by prescaling multiplier stage 203, outputs from such prescaling multiplier stage 203 are used for an initial iteration of iterative multiply-subtract operations for a fixed-radix division. After the initial iteration, the next and all other subsequent multiply-subtract iterations for such fixed-radix division are performed using feedback from multiply-subtract stage 222 and prescaled divisor digits from divisor bus 211, and not using prescaled dividend digits from dividend bus 212.

Multiplexers of multiplexer stage 208 are used to select outputs from prescaled dividend 241 digits from prescaling multiplier stage 203 for an initial iteration for generating quotient digit 210 and thereafter selecting feedback and cascade input from multiply-subtract stage 222 for subsequent iterations in order to provide quotient digit 210. Such selection by multiplexers of multiplexer stage 208 may be responsive to new division control select signal 209. Multiplexer 214 may receive new division control select signal 209, though not illustratively shown in FIG. 2 for purposes of clarity, for selecting output from a most significant digit of prescaled dividend 241 for an initial iteration for an initial estimate of quotient digit 210 and a topmost section 221-1 of multiply-subtract stage 222 for iterative output of digits for quotient digit 210 on subsequent iterations of a fixed-radix division. Thus, input on divisor bus 211 is provided to and input on dividend bus 212 is passed through multiplexer stage 208 to multiply-subtract stage 222 for a first iteration for a then current fixed-radix division calculation. Thereafter, for completing such calculation using subsequent iterations, input on feedback bus 213, a prescaled divisor on divisor bus 211, cascaded inputs from outputs 223-1 through 223-3 of multiply-subtract stage 222, and feedback from outputs 221-1 through 221-3 of multiply-subtract stage 222 are used as inputs to sections 222-1 through 222-3, respectively, for subsequent iterations, where cascaded inputs from outputs 223-1 through 223-3 and feedback inputs via feedback bus 213 are selectively provided via multiplexers of multiplexer stage 208.

Each output of sections 222-1 through 222-3 is broken out into two portions. Thus, output from section 222-1 is output 221-1 and 223-1, both of which are provided as feedback. However, output 223-1 is provided as feedback via multiplexers of multiplexer stage 208 for multiplication by multipliers 216-1 through 216-3 with input from divisor bus 211 for a second and all subsequent iterations of a fixed-radix division calculation.

It should be understood that although no registers and clock signaling are illustratively shown in FIG. 2 for purposes of clarity, register stages would be implemented for pipelined operation of iteration engine 200. However, as use of registers for pipelined operation is well known and would be understood, such registers have been omitted from FIG. 2 for purposes of clarity.

In the particular embodiment illustratively shown in FIG. 2, for a first iteration of a fixed-radix division, the lower input on each multiplexer of the multiplexers of multiplexer stage 208 is selected, and the most significant digit of prescaled dividend 241 is used as first estimate for quotient digit 210, as provided to multiplexer 214. Furthermore, such prescaled dividend 241 is broken out in this example into three digits, one for each of sections 222-1 through 222-3 of multiply-subtract stage 222. For purposes of clarity and not limitation, it shall be assumed that the fixed-radix division is for radix 16. For radix 16, N of FIG. 2 would equal four. Thus, each digit would be four bits long. Accordingly, each four bit digit of prescaled dividend 241 is respectively used for multiplication with an associated prescaled divisor 242 digit, and the product of each such multiplication is subtracted from a digit of the dividend digit of the prior iteration. In other words, an iterative calculation is used to multiply a divisor digit by a quotient digit estimate and then subtract the result from a residue of a previous iteration, except that for an initial iteration, there is no residue from a previous iteration. Again, not all the buses are exactly N bits wide, as the results of each iteration are allowed to correct for errors in the previous iteration or previous iterations. This forces iteration results to overlap, and this overlap means that operative bus widths may be allowed to vary from N. Specifically, buses 221-1 through 221-3 are N+2 bits wide in this embodiment. While a two-bit overlap is assumed to be a minimum overlap, overlaps greater than two bits may be used.

As indicated in this particular example, multiply-subtract operations may be performed in sections forming results or residues in a redundant number representation rather than a more common two's complement representation. The resulting residue produced from each section 222-1, 222-2, and 222-3 of multiply-subtract stage 222 is what may be termed a "true" residue expressed in a redundant number system.

As between stages of multiply-subtract stage 222, such as between stages 222-2 and 222-3, and between stages 222-1 and 222-2, the significance of digits from each of such sections overlaps one another. Hence digits of equal significance are added together by an adder of adders 218-1 through 218-3 before being used as the add operand provided to a subtractor of subtractors 217-1 through 217-3 for a subtract operation of the multiply-subtract operation. For example, with reference to section 222-1, the multiply part of the multiply-subtract operation is performed by multiplier 216-1, and adder 218-1 is used to add feedback output 221-1 from topmost section 222-1 with feedback output 223-2 from middle section 222-2 to account for such overlap. Output from multiplier 216-1 is subtracted from output of adder 218-1 by subtractor 217-1. Output of subtractor 217-1 may be 2N bits, and thus the most significant digit of N bits of such 2N bit output may be used as feedback output 223-1 and the least significant digit of N bits of such 2N bit output may be used as feedback output 221-1.

Even though the above example was described with respect to section 222-1, it should be appreciated that such description is equally applicable to sections 222-2 and 222-3 with some differences. One difference is that feedback output 223-2 is provided for input to adder 218-1 of section 222-1, and feedback output 223-3 is provided for input to adder 218-2 of section 222-2. Additionally, for a least significant or lowest order section of multiply-subtract stage 222, namely section 222-3, there is no significance of digits overlap with a lower order section. Thus, for section 222-3, a logic 0 219 is input to a multiplexer for selection responsive to new division control select signal 209 after an initial iteration for a fixed-radix division calculation for input to adder 218-3 of section 222-3 for addition with feedback 221-3.

For purposes of clarity by way of example and not limitation, a numerical example is provided to enhance understanding. For a redundant number representation, if the original division is 71H/34H, where "H" denotes hexadecimal ("hex") notation, and the radix is 16, where each digit is four bits long or wide. Assuming estimate 207 from LUT 206 is 5H, the division, once prescaled, becomes 235H/104H.

Continuing the above example, in the first iteration, the first digit of prescaled dividend 241 is 2 (i.e., the 2 in 235H) and is used to multiply each of the digits of divisor X 202 yielding 2, 0, and 8 (i.e., 2*1 where the 1 is the most significant digit in 104H, 2*0 where the 0 is the second most significant digit in 104H, and 2*4 where the 4 is the least significant digit in 104H), respectively, for input to sections 222-1 through 222-3. The product digits respectively from multipliers 216-1 through 216-3, namely outputs 2, 0, and 8, are subtracted respectively by subtractors 217-1 through 217-3 from corresponding prescaled dividend digits respectively output from adders 218-1 through 218-3 to provide partial residues of 0, 3, and −3, namely a residue of 0, 3, and −3.

If this residue was to be resolved, the result for quotient digit 210 would be 2D. In other words, 2×104+2D in hex notation yields 235 in hex notation. In the next iteration, multiplexers of multiplexer stage 208 switch outputs responsive to new division control select signal 209 to use the upper input thereof so that partial residues 3 and −3 are used as the basis of the next iterative calculation. The most significant digit of residue value 3 becomes the next quotient digit and is used to multiply a prescaled divisor in a subsequent iteration.

The above example is a simplification to show the purpose of multiplexers of multiplexer stage 208. In an actual implementation, because the error inherent in the fact that the residue is not fully resolved in a redundant number system, the new quotient digit for each iteration is modified by a previous quotient digit of higher significance which means some shifting of residue buses, such as some shifting of residues on what may be termed residue buses 221-1 through 221-3 in the feedback path of multiply-subtract stage 222 may be implemented.

The above prescaling operation described with reference to FIG. 2 is performed on each operand, namely dividend Y 201 and divisor X 202, and each such prescaling operation is a multiplication. However, in terms of circuit resources multiplication is an expensive operation. In order to reduce the circuit resources involved in such prescaling, it was determined that the iterative calculation may be prescaled with the divisor to fully resolve a two's complement representation and not prescaled with respect to the dividend. Because an iterative multiply-subtract operation produces a residue for each iteration in a redundant number representation, such residue is used for input in a next or subsequent iteration. Because a multiply-subtract stage may receive input in a redundant number representation, the operation to generate a prescaled dividend need not resolve the result into a two's complement representation as was done in the past, but may create the result in a same redundant number representation as used in a multiply-subtract stage. As shall be appreciated from the following description, generating a result in a redundant number representation or form may be less complex with respect to circuit resources, and also may be faster because there are less circuit resources involved. By determining that the prescaling of the dividend may be omitted, such prescaling operation effectively may be embodied in an iteration engine in a multiply-subtract stage by enhancing a multiplexer stage so as to switch between a prescale operation and subsequent iterative operations.

As shall be appreciated from the following description additional multiplexers are added to a multiplexer stage of an iteration engine, and a subtraction operation is bypassed for a prescaling cycle or iteration, namely there is an addition of 0.

By removal of dedicated hardware for dividend prescaling, namely removal of multiplier 204, there is an additional benefit beyond just the avoidance of having another multiplier for prescaling. Previously, a larger dividend would result in a larger multiplication and hence a greater delay for dividend prescaling. This has in part to do with both the presence of prescaling and the output being in a two's complement format. However, for a calculation in a redundant number representation, a product may be obtained more readily than in the above-described fully resolved calculation of equivalent size. Effectively, the dividend is prescaled as described below in additional detail before any multiply-subtract iteration is performed with respect to obtaining a quotient output. However, the prescaling is done with an iteration of the multiply-subtract stage of an iteration engine which is in a redundant number representation. Hence, high fixed-radix divisions involving larger dividends than divisors may be performed with less delay than was previously obtained.

Figure 3:
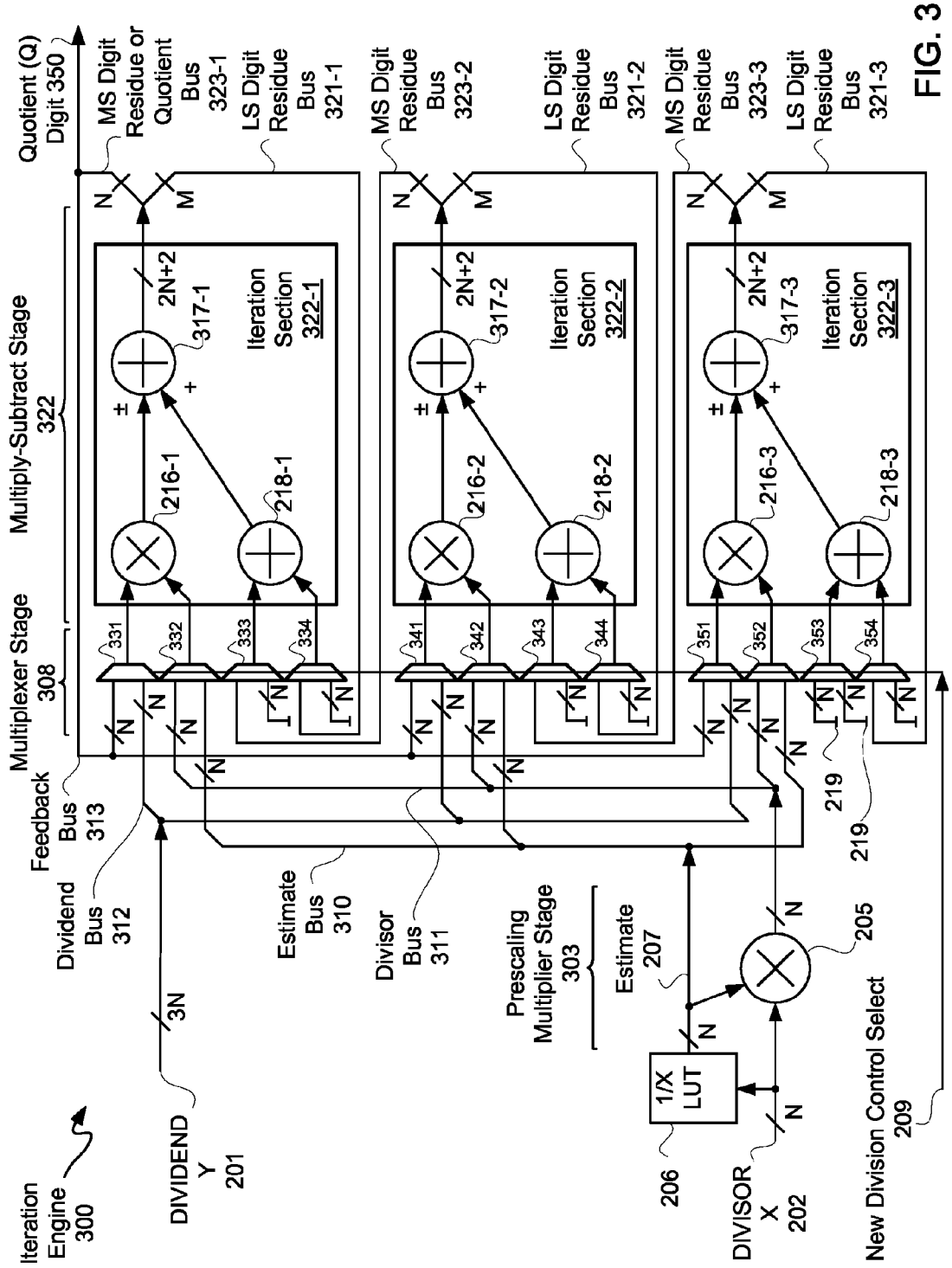
FIG. 3 is a circuit diagram depicting an exemplary embodiment of a new iteration engine for fixed-radix division.

FIG. 3 is a circuit diagram depicting an exemplary embodiment of an iteration engine 300. Iteration engine 300 is coupled for receiving a dividend Y 201 and a divisor X 202, as well as a new division control select signal 209. Iteration engine 300 may be implemented in field programmable gates of programmable logic fabric of an FPGA, such as FPGA 100 of FIG. 1, or may be implemented using dedicated hardware resources. With respect to implementation in FPGA 100, it should be appreciated that DSP blocks may be used for implementing iteration engine 300 in addition to field programmable gates of FPGA fabric. Moreover, iteration engine 300 may be used for radix-based division, including without limitation high fixed-radix division.

Divisor X 202, which for this example is N bits wide or long, is provided as an input to LUT 206 to obtain an estimate 207, as previously described with reference to FIG. 2. Estimate 207, output from LUT 206, is provided to estimate bus 310, as well as provided as an input to multiplier 205. Divisor X 202 is further provided to multiplier 205 for prescaling. Multiplier 205 receives estimate 207 from LUT 206 and receives divisor X 202 for prescaling in a prescaling multiplier stage 303. The prescaled divisor output from multiplier 205 is provided to divisor bus 311. Dividend Y 201, which in this example is 3N bits long or wide, is provided to dividend bus 312.

Even though they are not shown for purposes of clarity and not limitation, it should be appreciated that registers may be part of iteration engine 300 for forming a pipelined iteration engine 300. Thus for example, dividend Y 201 and divisor X 202 may be registered for providing as inputs to iteration engine 300. Additionally, there may be a register stage in front of multiplexer stage 308 for receiving input from buses 310 through 312, as well as feedback bus 313. Additionally, there may be a register stage at the output side of iteration sections 322-1 through 322-3 of multiply-subtract stage 322. The iteration sections 322-1 through 322-3 are arranged in order or ranked from highest to lowest, namely from most significant to least significant.

Dividend Y 201 is broken out into sections or portions, in this example into three portions, accordingly to the number of iteration sections of multiply-subtract stage 322 used for performing the fixed-radix division. Again, for purposes of clarity by way of example and not limitation, it shall be assumed that a radix 16 division is employed, and N is equal to four bits. Furthermore, for such a fixed-radix division, there are three iteration sections 322-1 through 322-3. However, it should be appreciated that other radix values may be used, and accordingly fewer or more iteration sections, as well as fewer or more portions of dividend Y 201, respectively, may be used.

Dividend bus 312 is configured to take the four most significant bits of dividend Y 201 and provide them as a lower input to multiplexer 331 of multiplexer stage 308. A middle four bits of dividend Y 201 are provided as a lower input to multiplexer 341 of multiplexer stage 308 via dividend bus 312. Lastly, the least significant four bits of dividend Y 201 are provided from dividend bus 312 as a lower input of multiplexer 351.

A multiplexer stage 308 includes multiplexers 331 through 334, multiplexers 341 through 344, and multiplexers 351 through 354. On an initial iteration of multiply-subtract stage 322, such iteration or cycle is for prescaling ("prescaling iteration") in order to condition multiply-subtract stage 322 for subsequent division calculation iterations. For a prescaling mode, new division control select signal 209 is set to select the lower inputs of multiplexers of multiplexer stage 308 in this embodiment. The lower inputs of multiplexers 333, 334, 343, 344, 353, and 354 are all coupled to receive a logic 0 219. Such logic 0 input to such multiplexers is for a prescaling operation. It should be understood that multiplexer 353 of FIG. 3 may be omitted, and replaced with a buffer for timing reasons coupled to receive a logic 0 for providing to adder 218-3. Furthermore, a lowest order adder, such as adder 218-3 in this embodiment, may be replaced with a buffer. However, for FPGAs, such a multiplexer 353 and adder 218-3 may be present and thus may be otherwise unused, and thus use of such multiplexer 353 and adder 218-3 means that insertion of a buffer or buffers for these circuits may be avoided. Furthermore, use of adder 218-3 and multiplexer 353 promotes symmetry in design, which may be useful in scaling iteration engine 300.

Additionally, the lower input of multiplexers 332, 342, and 352 are all coupled to receive estimate 207 via estimate bus 310. For one or more calculation iterations following a prescaling iteration, new division control select signal 209 is set to select the upper inputs of multiplexers of multiplexer stage 308 in this embodiment for a fixed-radix division calculation mode.

It should be understood that adding together logic 0s for a prescaling iteration using adders 218-1 through 218-3 is effectively a null operation, and thus in other embodiments adders 218-1 through 218-3 may be disabled for a prescaling iteration to avoid this null operation. Likewise for a prescaling iteration, respectively adding logic 0 partial sums from adders 218-1 through 218-3 to partial products respectively output by multipliers 216-1 through 216-3 using adder/subtractors 317-1 through 317-3 is effectively a null operation, and thus adds by such adder/subtractors 317-1 through 317-3 may be avoided, such as bypassing such adders, for a prescaling iteration. However, for purposes of clarity and not limitation, it shall be assumed that such adds of logic 0s are performed, even though in other embodiments one or more of such adds of logic 0 may be avoided.

For a prescaling iteration, new division control select signal 209 selects the lower input of multiplexers 331 through 334, 341 through 344, and 351 through 354, in this embodiment. Iteration section 322-1 includes multiplier 216-1, adder 218-1, and adder/subtractor 317-1. Thus, multiplier 216-1 of iteration section 322-1 multiplies estimate 207 with the most significant four bits of dividend Y 201 for output to adder/subtractor 317-1. Furthermore, the output of multiplexers 333 and 334 for such prescaling iteration, is zero for each and thus adder 218-1 of iteration section 322-1, which receives such outputs from multiplexers 333 and 334, provides a zero to adder/subtractor 317-1 of iteration section 322-1.

For a prescaling operation, adder/subtractor 317-1 is configured or set for an add operation. Thus the zero output from adder 218-1 is added to the prescaled dividend portion output from multiplier 216-1 to provide an output which is generally 2N bits long or wide. More particularly, as previously described to allow for overlapping results, output of multiplier 216 in this embodiment may be larger than 2N, namely 2N+2 bits wide to more fully capture the result. Output from iteration section 322-1 is apportioned into a most significant digit and a least significant digit. The most significant digit, namely the most significant four bits of the output of iteration section 322-1, is provided to a most significant digit residue or quotient bus 323-1 for output as an initial estimate of quotient digit 350 and for providing to feedback bus 313. The least significant digit, namely the least significant four bits in this example of the output of iteration section 322-1, is provided to least significant digit residue bus 321-1 for feedback to an upper input of multiplexer 334. The most significant digit quotient on bus 323-1 provided via feedback bus 313 is provided to upper inputs of multiplexers 331, 341, and 351.

The upper input of multiplexer 333 is obtained from the most significant digit residue bus 323-2 as a cascaded output from iteration section 322-2. Iteration section 322-2 includes multiplier 216-2, adder 218-2, and adder/subtractor 317-2. Iteration section 322-2 operates the same as iteration section 322-1 except it has as inputs the second most significant digit of dividend Y 201, and other lower order digits in accordance with its position in multiply-subtract stage 322. Accordingly, the output of iteration section 322-2 is likewise apportioned into a most significant digit for that section for a most significant digit residue bus 323-2 and a least significant digit residue for that section for a least significant digit residue bus 321-2. Such second order most significant digit on most significant digit residue bus 323-2 is provided as an upper input to multiplexer 333. Likewise, a second order least significant digit residue on bus 321-2 is provided as a feedback upper input to multiplexer 344.

Outputs of multiplexers 341 and 342 are provided as inputs to multiplier 216-2 of iteration section 322-2, and output of multiplier 216-2 is provided to adder/subtractor 317-2 of iteration section 322-2. Likewise, outputs of multiplexers 343 and 344 are provided as inputs to adder 218-2 of iteration section 322-2, and output of adder 218-2 is provided to adder/subtractor 317-2 of iteration section 322-2.

Iteration section 322-3 includes multiplier 216-3, adder 218-3, and adder/subtractor 317-3. Output of iteration section 322-3 is apportioned into a most significant digit residue and least significant digit residue via buses 323-3 and 321-3, respectively. Output on bus 323-3 is provided as a cascaded input to an upper input port of multiplexer 343, and output on bus 321-3 is provided as a feedback input to an upper input port of multiplexer 354. However, iteration section 322-3, being a lowest order iteration section, has an output which for the least significant digit residue has no lower order cascade input counterpart. An upper input to multiplexer 353 is logic 0 219. A logic 0 is input to an upper input of multiplexer 353 as iteration section 322-3 is the lowest order iteration section and there is no lower iteration section from which to obtain a cascaded input.

Upper inputs to multiplexers 332, 342, and 352 are prescaled divisor X 202 output from multiplier 205 provided by divisor bus 311. Again, for a prescaling iteration, outputs of multiplexers 331 and 332 are provided to multiplier 216-1 for prescaling. Likewise, estimate 207 is output from multiplexer 342 for prescaling a second most significant digit of dividend Y 201 provided via output of multiplexer 341, where outputs of multiplexers 341 and 342 are provided as input to multiplier 216-2 of iteration section 322-2. Furthermore, a least significant digit of dividend Y 201 is provided as output from multiplexer 351 to multiplier 216-3 of iteration section 322-3, and estimate 207 is provided as output from multiplexer 352 for input to multiplier 216-3 for a prescaling iteration.

A prescaling iteration performed by multipliers 216-1 through 216-3 of multiply-subtract stage 322 is in a redundant number system representation. Furthermore, for a prescaling operation, outputs of multiplexers 333, 334, 343, 344, 353, and 354 are all 0 where the pair of outputs from multiplexers 333 and 334 are provided as input to adder 218-1 of iteration section 322-1, the pair of outputs from multiplexers 343 and 344 are provided as input to adder 218-2 of iteration section 322-2, and the pair of outputs from multiplexers 353 and 354 is provided as input to adder 218-3 of iteration section 322-3. Outputs of multiplier 216-1 and adder 218-1 are provided as input to adder/subtractor 317-1, which for a prescaling operation performs an add operation to provide an output as previously described. Outputs of multiplier 216-2 and adder 218-2 are provided to adder/subtractor 317-2, which for a prescaling operation performs an add operation to provide output as previously described. Outputs of multiplier 216-3 and adder 218-3 are provided as input to adder/subtractor 317-3, which for a prescaling operation performs an add operation to provide an output as previously described.

After a prescaling iteration has been completed, it should be appreciated that multiply-subtract stage 322 has been preconditioned for iteratively performing calculations for a fixed-radix division. Accordingly, new division control select signal 209 may be used to select the upper inputs for calculation iterations for resolving a fixed-radix division once multiply-subtract stage has been preconditions by an prescaling iteration for such fixed-radix division.

Thus, for example, with reference to iteration section 322-1, for first and subsequent calculation iterations, input to multiplier 216-1 is obtained from feedback bus 313 via multiplexer 331 and a prescaled divisor is obtained from divisor bus 311 via multiplexer 332. Furthermore, for a calculation iteration for a fixed-radix division, input to adder 218-1 is: a least significant digit residue from a prior iteration via bus 321-1 and multiplexer 334, and a next lower order most significant digit via most significant digit residue bus 323-2 and multiplexer 333. It should be understood that iteration section 322-2 is a lower order than iteration section 322-1 with respect to digits or bits of dividend Y 201, and thus a most significant digit from iteration section 322-2 does not represent the most significant digit of quotient ("Q") digit 350 even though such digit is passed up to iteration section 322-1 for processing by iteration section 322-1. In other words, a most significant digit output on most significant digit quotient bus 323-1 to provide quotient digit 350 iteratively yields the most significant digit followed by a next most significant digit and so on until the least significant digit is obtained. However, each of these digits of a quotient result of a resolved quotient provided via quotient digit 310 is at some time processed by iteration section 322-1. This may be analogized to long division where the first obtained output is in the most significant number followed by the next most significant number and proceeding in place order on down to an answer.

Operation of iteration section 322-2 and iteration section 322-3 follows from the above description of operation of iteration section 322-1, except that with respect to iteration section 322-3, an upper input of multiplexer 353 provided as an input to adder 218-3 is a logic 0 219, as there is no lower order iteration section as previously described. Thus, for purposes of clarity, operation of iteration sections 322-2 and 322-3 is not described to avoid repetition. However, it should be appreciated that each digit of a dividend Y 201 may be apportioned among iteration sections for multiply-add operations for a prescaling iteration followed by one or more multiply-subtract operations calculation iterations. For a prescaling iteration for a fixed-radix division, adder/subtractors 317-1 through 317-3 are configured or set for add operations, and for subsequent calculation iterations for such fixed-radix division, such adder/subtractors 317-1 through 317-3 are configured or set for subtract operations. Furthermore, it should be appreciated that each digit is iteratively processed in an associated section with propagation to a next higher section for purposes of iteratively outputting a solution.

It should be appreciated that additional multiplexers are illustratively shown in FIG. 3 in comparison to the multiplexers shown in FIG. 2. In this example, there are four multiplexers per iteration section shown in FIG. 3 for a prescaling iteration as well as one or more subsequent calculations for performing a fixed-radix division. Multiplexers 331, 341, and 351 each select between a current quotient digit and a digit of dividend Y 201, where the digit of dividend Y 201 is obtained by apportioning such dividend according to order of iteration sections. Multiplexers 332, 342, and 352 select between a section of a prescaled divisor and an estimate, where the estimate is the reciprocal of the divisor. Multiplexers 333 and 343 select between a most significant digit from a lower order iteration section or a logic 0. Because multiplexer 353 is associated with lowest order iteration section 322-3, multiplexer 353 always selects 0, as a logic 0 is input to both the upper and lower inputs for such multiplexer 353. Multiplexers 334, 344, and 354 select between a least significant digit from the same associated iteration section from a previous iteration or a logic 0.

Hence, with each multiplexer selecting its lower input for a prescaling iteration, the prescaling operation performed is piecewise multiplications of sections of a dividend Y 201 by estimate 207, where estimate 207 is the reciprocal of divisor X 202. For calculation operations, each of the multiplexers selects its upper input. For example, for the two higher iteration sections 322-1 and 322-2, the calculation operation is the product of the current quotient digit 350 obtained from feedback bus 313 and a prescaled divisor, basically divisor X 202, from divisor bus 311, the product of which is subtracted from the sum of the least significant residue digit associated with that iteration section and the most significant residue quotient digit associated with the next lower order iteration section. And, for the lowest order iteration section 322-3, the calculation operation is the product of the current quotient digit 350 obtained from feedback bus 313 and a prescaled divisor, basically divisor X 202, from divisor bus 311, the product of which is subtracted from the sum of the least significant residue digit associated with that iteration section and a logic 0.

Because residue is calculated in sections, a carry is not resolved. It should be understood that a residue is not an error, but rather may be thought of as a resolution limit. For a division, there may be no residue, other than zero, at the completion of such a division. However, for another division, after some number of iterations, there may be some residue remaining. While this introduces a possible error into the quotient digit output 350, because the quotient digit is used in subsequent calculation iterations, the error information is not lost. Rather, the error information will affect the value of the residue in the next iteration. The fact that the quotient digit may be incorrect initially means the range of possible residue values is larger than the quotient digit was assumed to be correct. For the algorithm to obtain a correct complete quotient, each quotient digit 350 is able to correct the error in the previously resolved quotient digit 350. To obtain this result, the residue from each iteration may be shifted to the left (i.e., toward the least significant bits), namely divided by a power of two, by N bits and the weight of the quotient digit produced on the next iteration is shifted N bits to the right. This shifting is not illustratively shown in FIG. 3 because such shifting is a constant and is assumed to be performed by hardwiring. Furthermore, non-restoring correction of previously resolved quotient digits by shifting as described is known but is mentioned herein for purposes of completeness.

By using a redundant number system for dividend Y 201 instead of a two's complement format, the implementation may be faster than if a two's complement notation where used. In other words, the "critical path" of a calculation in a two's complement number representation is the carry propagation. In a redundant number system the carry propagation is limited to sections, such as iteration sections 322-1 through 322-3. Thus each iteration section individually has a shorter carry chain propagation delay using a redundant number system representation in comparison to the overall carry chain propagation delay of a two's complement carry.

A shorter carry chain propagation delay results in a circuit which operates faster, potentially at the expense of a possible error in more significant digits. However, the error magnitude is limited to the magnitude of the carry significance, and because the information of the error is not lost, the implementation of the algorithm may address this source of error in subsequent estimates of the quotient, as previously described.

Figure 4A:
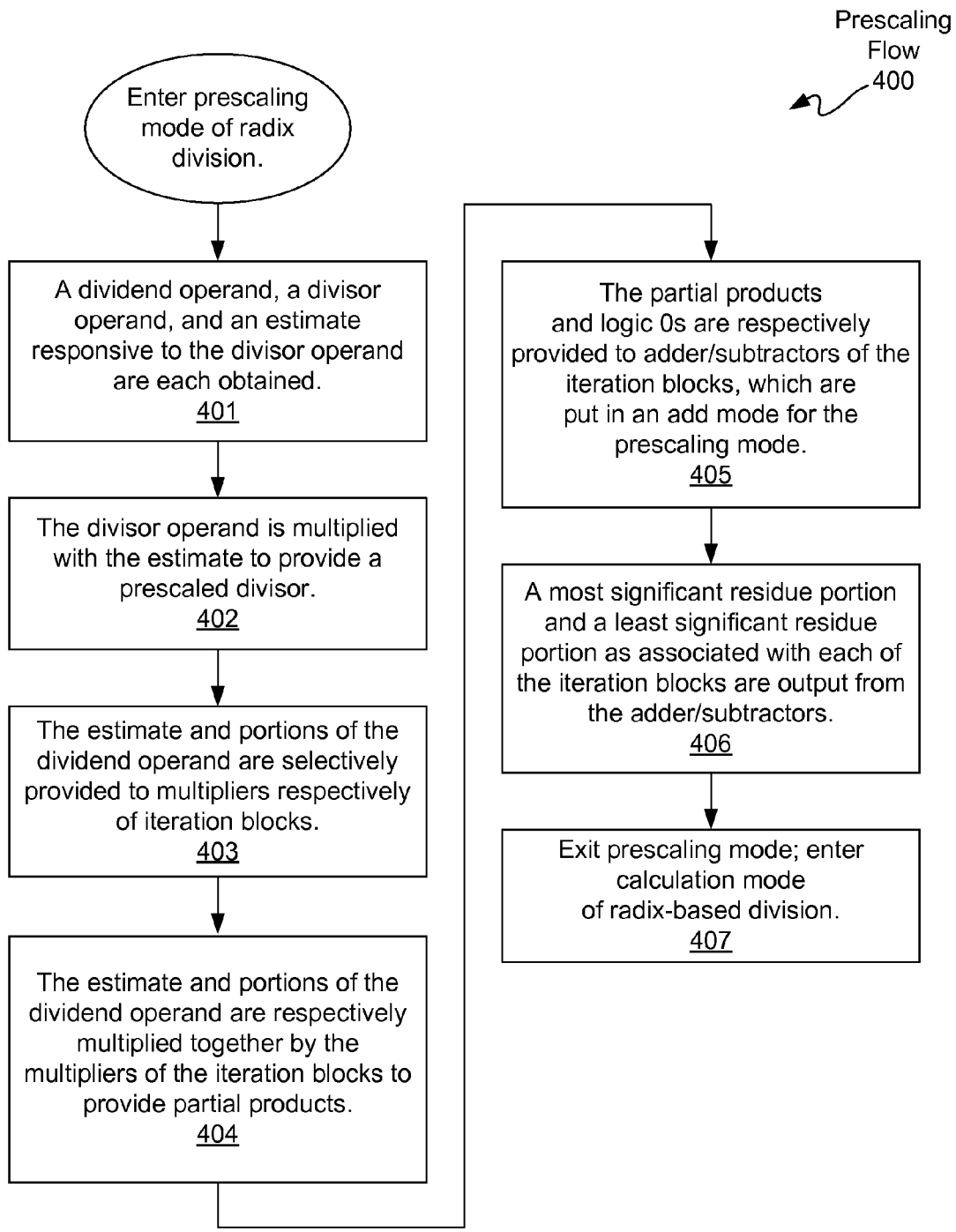
FIG. 4A is a flow diagram depicting an exemplary embodiment of a prescaling flow representing the first portion of a fixed-radix division.

FIG. 4A is a flow diagram depicting an exemplary embodiment of a prescaling flow 400 representing the first portion of a fixed-radix division. It should be understood that such fixed-radix division may be performed for a high fixed-radix division as being for radices greater than 4.

At 401, a dividend operand, a divisor operand, and an estimate responsive to the divisor operand are each obtained. For a prescaling mode, a prescaling iteration is performed as the first iteration of the fixed-radix division. At 402, the divisor operand is multiplied with the estimate to provide a prescaled divisor.

At 403, the estimate and portions of the dividend operand are selectively provided to multipliers respectively of iteration sections or blocks of an iteration engine. It should be appreciated that for prescaling flow 400, inputs to iteration blocks are selected responsive to select signaling provided to multiplexers of the iteration engine, such as for example multiplexers associated with multiplexer stage 308 of iteration engine 300 of FIG. 3. Such multiplexers then provide selected inputs to iteration blocks as described below. For purposes of clarity and not limitation, inputs are described below as being provided to, for example, multipliers or adders of iteration blocks; however, it should be appreciated that in each instance, multiplexers receive and select such inputs responsive to select signaling.

At 404, the estimate and portions of the dividend operand are respectively multiplied together by multipliers of the iteration blocks to provide partial products. The partial products are numbers, which after being added together form a result. Thus, the partial products represent portions of a prescaled dividend. At 405, the partial products and logic 0s, from add operations of logic 0 plus logic 0 as previously described, are respectively provided to adder/subtractors of iteration blocks, which adder/subtractors are put in an add mode for the prescaling mode.

At 406, a most significant residue portion and a least significant residue portion as associated with each such iteration block are output from the adder/subtractors. For prescaling flow 400, it should be appreciated that each of the iteration blocks operates on operands in the exact same way. As shall be discussed in additional detail below, different iteration blocks are processed differently in a calculation mode.

Figure 4B:
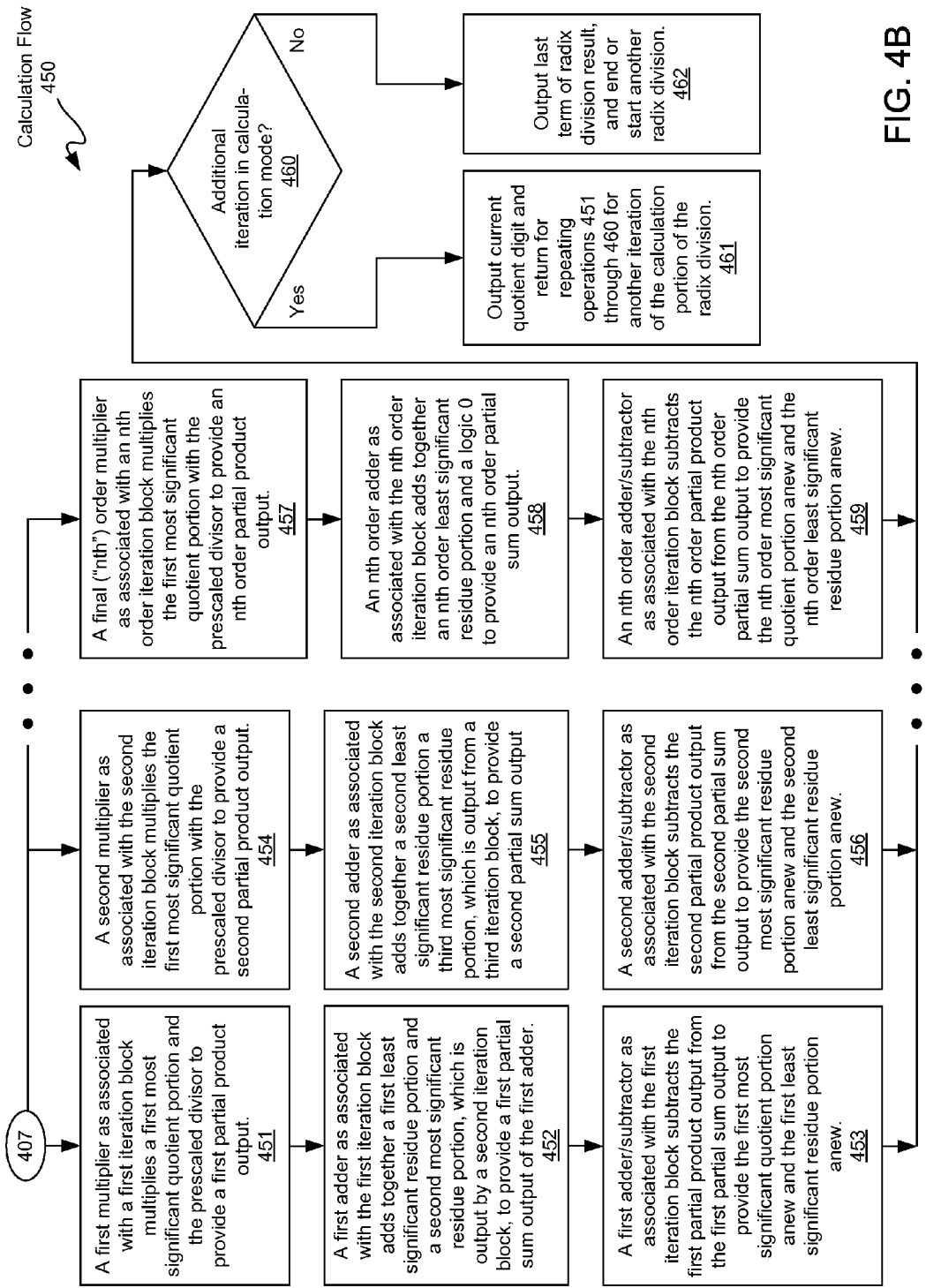
FIG. 4B is a flow diagram depicting an exemplary embodiment of a calculation flow for continuing the fixed-radix division of FIG. 4A.

At 407, prescaling flow 400 ends, and the fixed-radix division exits a prescaling mode and enters a calculation mode to begin one or more calculation iterations as associated with calculation flow 450 of FIG. 4B.

FIG. 4B is a flow diagram depicting an exemplary embodiment of a calculation flow 450 for continuing the fixed-radix division of FIG. 4A.

It should be appreciated that calculation flow 450 is performed using the same set of iteration blocks as prescaling flow 400. In the embodiment illustratively shown above in FIG. 3, it is assumed that there are three iteration blocks; however, it should be apparent to one skilled in the art that there may be two or more iteration blocks used to obtain a quotient result. With continuing reference to iteration engine 300 of FIG. 3 and prescaling flow 400 of FIG. 4A, calculation flow 450 is further described.

For going from the prescaling iteration to a first calculation iteration of a set of calculation iterations, inputs to the iteration blocks are selected by changing state of the select signaling provided to the multiplexers of iteration engine, such as for example multiplexers of multiplexer stage 308 of iteration engine 300. Again, for purposes of clarity and not limitation, inputs are described below as being provided to, for example, multipliers or adders of iteration blocks; however, it should be appreciated that multiplexers select such inputs as part of each iteration of the iteration engine.

At 451, a first most significant quotient or residue portion associated with a first iteration block, which was generated at 406 of prescaling flow 400, is fed back to a first multiplier as associated with such first iteration block. The prescaled divisor, which was generated at 402 of prescaling flow 400, is also provided to the first multiplier. The first most significant quotient portion is multiplied with the prescaled divisor to provide a first partial product output.

At 452, a first least significant residue portion associated with the first iteration block and generated at 406 of prescaling flow 400 is fed back to a first adder as associated with such first iteration block. A second most significant residue portion output as associated with a second iteration block is provided to the first adder. Such second most significant residue portion and first least significant residue portion are added together to provide a first partial sum output of the first adder.

At 453, a first adder/subtractor as associated with the first iteration block, which has been put in a subtract mode for the calculation mode; subtracts the first partial product output from the first partial sum output to provide the first most significant quotient portion anew and the first least significant residue portion anew.

At 454, the first most significant quotient portion is provided to a second multiplier as associated with the second iteration block. For example, in the embodiment illustratively shown in FIG. 3, it should be appreciated that the first most significant quotient portion is provided to each of multipliers 216-1 through 216-3 via feedback bus 313. Returning to calculation flow 450, at 454, the prescaled divisor obtained at 402 is also provided to the second multiplier, and the first most significant quotient portion is multiplied with the prescaled divisor to provide a second partial product output.

At 455, a second least significant residue portion as associated with the second iteration block is fed back to a second adder as associated with the second iteration block. The second adder also receives a third most significant residue portion output from a third iteration block. Such third most significant residue portion and the second least significant residue portion are added together to provide a second partial sum output.

At 456, a second adder/subtractor as associated with the second iteration block and which has been put in a subtract mode for the calculation mode, subtracts the second partial product output from the second partial sum output to provide the second most significant residue portion anew and the second least significant residue portion anew.

As described above, it should be understood that there may be two or more iteration blocks in an iteration engine performing a fixed-radix division, even though the example of FIGS. 4A and 4B assumes at least three iteration blocks. Thus, there may be one or more iteration blocks after the second iteration block and prior to the final ("nth") iteration block for processing operands associated therewith by repeating steps 454 through 456 for such iteration blocks, if any. Furthermore, it should be understood that iteration blocks process operands associated therewith in parallel in a pipeline mode, with cascaded and feedback inputs as previously described. Such cascaded and feedback inputs are not shown among flows of FIGS. 4A and 4B for purposes of clarity and not limitation.

For an nth iteration block, at 457, the first most significant quotient portion and the prescaled divisor are provided to a lowest order or final ("nth") order multiplier of an nth order iteration block. The nth order multiplier multiplies the nth order most significant quotient portion with the prescaled divisor to provide an nth order partial product output.

At 458, an nth order least significant residue portion is fed back to an nth order adder of the nth order iteration block. The nth order adder also is provided with a logic 0. It should be appreciated that as there is no lower order iteration block to provide a next most significant residue portion as is provided to each of the adders of the higher order iteration blocks, and thus a logic 0 is provided instead. The nth order adder adds together the nth order least significant residue portion and the logic zero to provide an nth order partial sum output.

At 459, an nth order adder/subtractor, which has been placed in a subtract mode for the calculation mode, subtracts the nth order partial product output from the nth order partial sum output to provide the nth order most significant residue portion anew and the nth order least significant residue portion anew.

In a calculation mode of a fixed-radix division, calculation iterations may be repeated to generate a quotient result within a specified precision. Accordingly, at 460, it is determined whether another calculation iteration is to be performed. If at 460 it is determined that another calculation iteration is to be performed, then at 461 calculation flow outputs a current quotient digit from operation 453 and returns for repeating operations 451 through 459 for all iteration blocks. If, however, at 460, it is determined that a quotient result has been obtained to a specified precision or after a set maximum number of iterations, then at 462 a last term of fixed-radix division result is output for calculation flow 450 and calculation flow 450 then ends or starts another fixed-radix division.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method of fixed-radix division, comprising:
   obtaining an estimate which is a reciprocal of a divisor operand;
   for a prescaling mode, performing a prescaling iteration including:
      multiplying, using an iteration engine, the divisor operand with the estimate to provide a prescaled divisor for a calculation mode of the fixed-radix division;
      apportioning a dividend operand into portions from most significant to least significant;
      providing the estimate to iteration blocks of the iteration engine;
      the iteration blocks ordered from highest to lowest;
      providing the most significant to the least significant of the portions of the dividend operand respectively to the highest to the lowest of the iteration blocks;
      respectively multiplying the portions of the dividend operand with the estimate to provide first partial products that represent portions of a prescaled dividend for the calculation mode; and
      parsing first most significant residue portions and first least significant residue portions as associated with order of the iteration blocks from the first partial products for the calculation mode;
   wherein the prescaled divisor is in a two's complement format and the dividend operand apportioned is in a redundant number system format.

2. The method according to claim 1, further comprising performing at least one calculation iteration of the calculation mode following the prescaling iteration.

3. The method according to claim 2, wherein each of the at least one calculation iteration includes:
  feeding back a highest of the most significant residue portions;
  respectively multiplying the highest of the most significant residue portions with the prescaled divisor provided to each of the iteration blocks to provide second partial products;
  feeding back the least significant residue portions to the iteration blocks from whence the least significant portions were output;
  cascading second highest to lowest of the most significant residue portions from second highest to lowest of the iteration blocks, respectively, up to highest to second lowest of the iteration blocks, respectively;
  respectively adding the second highest to the lowest of the most significant residue portions with highest to second lowest of the least significant residue portions to provide partial sums as respectively associated with the highest to the lowest of the iteration blocks;
  for the highest to the second lowest of the iteration blocks, respectively subtracting the second partial products associated with the highest to second lowest of the iteration blocks from the partial sums associated therewith to provide a portion of second most significant residue portions and a portion of second least significant residue portions; and
  for the lowest of the iteration blocks, subtracting a partial product of the second partial products associated with the lowest of the iteration blocks from a lowest of the least significant residue portions fed back thereto to provide another portion of the second most significant residue portions and another portion of the lowest least significant reside portions.

4. The method according to claim 3, wherein:
  each of the iterations blocks includes a multiplier for the multiplying, an adder for the adding, and an adder/subtractor for the subtracting;
  each of the iteration blocks are configured to add logic 0s together using the adder respectively thereof to provide logic zero results for the prescaling iteration; and
  each of the iteration blocks are configured to add the logic 0 results using the adder/subtractor thereof respectively to the first partial products for the prescaling iteration.

5. The method according to claim 4, further comprising adding a logic 0 input to the lowest of the least significant residue portions for the at least one calculation iteration.

6. The method according to claim 4, wherein the fixed-radix division is a high fixed-radix division having a radix at least greater than 4.

7. The method according to claim 4, wherein for the prescaling iteration the estimate, the most significant to the least significant of the portions of the dividend operand, and the logic 0s are selectively input to the iteration blocks responsive to select signaling provided to multiplexers.

8. The method according to claim 7, wherein:
  for going from the prescaling mode to the calculation mode includes changing state of the select signaling provided to the multiplexers; and
  for the at least one calculation iteration, the highest of the most significant residue portions fed back, the prescaled divisor, the least significant residue portions fed back, the second highest to the lower of the most significant residue portions cascaded, and the logic 0 input to the lowest of the least significant residue portions are all selectively input to the iteration blocks responsive to the select signaling provided to multiplexers.

9. The method according to claim 8, further comprising instantiating the iteration blocks using digital signal processing blocks of a programmable logic device.

10. An iteration engine for fixed-radix division, comprising:
  a dividend input port coupled for input to a dividend bus;
  a divisor input port coupled for input to a look-up table and a multiplier;
  an estimate bus and the multiplier coupled to receive output from the look-up table;
  a divisor bus coupled to receive output from the multiplier;
  the dividend bus configured to apportion a dividend operand among iteration blocks;
  a multiplexer stage coupled to the divisor bus, the dividend bus, and the estimate bus on a data input side of the multiplexer stage;
  the multiplexer stage having a select port for putting the iteration engine into either a prescaling mode or a calculation mode;
  a data output side of the multiplexer stage coupled to the iteration blocks;
  the multiplexer stage further coupled to the feedback bus on the data input side of the multiplexer stage;
  the iteration blocks arranged in order from highest to lowest;
  each of the iteration blocks configured to provide a most significant residue portion and least significant residue portion respectively associated therewith;
  a highest order of the iteration blocks coupled to a feedback bus and a quotient output port for providing the most significant residue portion of the highest order of the iteration blocks respectively thereto;
  each of the iteration blocks other than highest order coupled to provide the most significant residue portion thereof to the multiplexer stage for input to an iteration block immediately higher in the order; and
  each of the iteration blocks coupled to provide the least significant residue portion thereof to the multiplexer stage for respective feedback input thereto;
  wherein the multiplier is configured to generate a prescaled divisor for the calculation mode during the prescaling mode; and
  wherein the iteration blocks are configured to generate first partial products that represent portions of a prescaled dividend for the calculation mode during the pre-scaling mode
  wherein the prescaled divisor is in a two's complement format and the dividend operand apportioned is in a redundant number system format.

11. The iteration engine according to claim 10, wherein the multiplexer stage is coupled to receive a logic zero for each of the iteration blocks, the logic zero being for the prescaling mode.

12. The iteration engine according to claim 11, wherein a lowest order of the iteration blocks is coupled to receive via the multiplexer stage the logic zero for the calculation mode.

13. The iteration engine according to claim 12, wherein each of the iteration blocks includes a multiplier, an adder, and an adder/subtractor, the adder/subtractor for being set as an adder for the prescaling mode and as a subtractor for the calculation mode.

14. The iteration engine according to claim 13, wherein for the prescaling mode, the multiplexer stage is configured to:

provide the logic zero to inputs of the adder of each of the iteration blocks;

provide a respective portion of the dividend operand on the dividend bus and an estimate on the estimate bus to the multiplier of each of iteration blocks; and the respective portion of the dividend operand being commensurate with the order of the iteration blocks.

15. The iteration engine according to claim 14, wherein for the calculation mode, the multiplexer stage is configured to:

provide the prescaled divisor on the divisor bus and the most significant residue portion of the highest order of the iteration blocks on the feedback bus to the multiplier of each of iteration blocks;

provide to the adder of each of the iteration blocks other than the lowest order the most significant residue portion from the iteration block immediately lower in the order;

provide to the adder of each of the iteration blocks the least significant residue portion thereof for feedback input thereto; and provide to the adder of the lowest order of the iteration blocks the logic zero.

16. The iteration engine according to claim 15, wherein the look-up table has stored therein estimates including the estimate, where the estimates are predetermined values of reciprocals of divisor operands including the divisor operand.

17. The iteration engine according to claim 15, wherein signal paths from the lowest order of the iteration blocks to the highest order of the iteration blocks for respectively cascading the most significant output portions are hardwired to provide shifts for error correction.

18. The iteration engine according to claim 10, wherein the iteration blocks are implemented in digital signal processing blocks of a programmable logic device.

* * * * *